017# United States Patent Office 2,746,273
Patented May 22, 1956

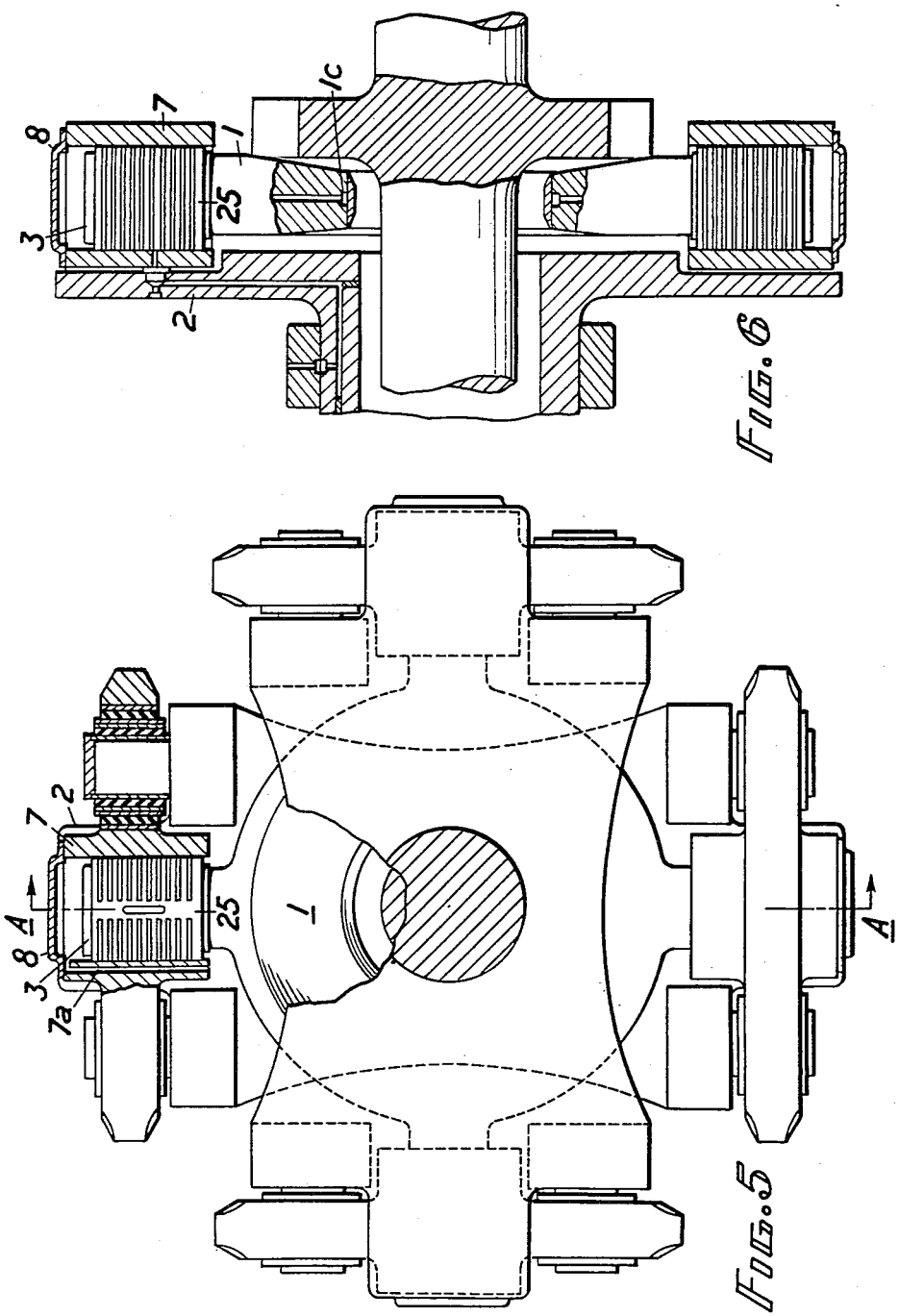

2,746,273
FLEXIBLE DRIVES

John Oliver Philip Hughes, Whetstone, near Leicester, England, assignor to The English Electric Company Limited, London, England, a British company Application August 31, 1953, Serial No. 377,664

Claims priority, application Great Britain September 8, 1952

4 Claims. (Cl. 64—17)

The invention relates to the lubrication of a flexible drive, for example of a flexible drive according to patent specification No. 2,554,739, or patent application Ser. No. 377,659, filed by applicant on August 31, 1953, having a gimbal member with radial gimbal pins slidable in bores of links resiliently connected to the driving arm and driven arm of the drive, respectively.

According to the invention, the sliding faces of the said gimbal pins in the said links are supplied with lubricating oil under pressure from a journal bearing of the driving member of the said flexible drive through radial ducts in the said driving arm and from there through resilient plunger couplings to the said links attached to this arm. The movements of these links relative to this arm are confined to a plane perpendicular to the axis of rotation, and are small and limited by the deformation of the rubber bonded bushings or discs connecting these links to the said arm, the main sliding movements which assure the flexibility of the drive taking place between these links and the gimbal pins.

Preferably the lubricating oil is supplied to the sliding faces in the links attached to the driven arm from the links connected to the driving arm through internal bores in the gimbal pins which are interconnected by an annular duct along the ring portion of the said gimbal member.

Preferably the lubricating oil is supplied through the said resilient plunger couplings to those sides of the sliding faces which lie fore and aft in the direction of the axis of rotation of the said drive and which are accordingly free from torque loading, so that they are not liable to wear and tear and no increase of clearance is likely to develop there, which might lead to a change in the rate of escape of oil. The said resilient plunger couplings issue the lubricating oil into longitudinal grooves arranged in the direction of the sliding movement of the said gimbal pins in the said links, and the lubricating oil spreads from there into crescent shaped grooves arranged parallel to one another with their deepest points on those parts of the circumference of the sliding surface which lie in the plane of rotation of the said drive which are consequently subjected to torque loading, and fading out towards the said longitudinal grooves.

The bores in the links in which the gimbal pins slide are closed outwards by caps in order to prevent loss of lubricating oil owing to centrifugal force. In order to prevent the building up of excessive oil pressure in the spaces between these caps and the ends of the gimbal pins owing to piston action of the said pins upon sudden relative movements of the driving and driven members, one or more relief ducts are provided in each link, leading inwards to vent points lying at substantially the same radial distance from the axis of rotation as the inner end of the sliding faces in these links, whereby losses of oil owing to centrifugal force through these relief ducts are avoided. Accordingly these pins operate in an oil bath within their bores in the links as closed by the said caps as soon as the speed of rotation exceeds a certain value and the centrifugal force acting on the oil is sufficient to overcome the static gravitation force in the oil. Below that speed the lubricating oil is supplied to the pins by the pressure of the lubricating pump feeding the bearings of the driving member.

Preferably the sleeves which are subjected to wear and tear by the sliding movements between the links and the gimbal pins are detchably fixed to the latter on tapering seats whereby these sleeves can be dismantled more easily.

Even though the lubricating oil is supplied through the driving arm only, it is convenient to provide the aforesaid longitudinal grooves on both sides of the said sleeves in order to avoid handling (using symmetrical rather than identical components) the same. In this case resilient plungers are provided also in the driven arm, which serve there merely as plugs for the bores in the links facing the same.

In order that the invention may be better understood and readily carried into effect, an embodiment thereof will now be described by way of example with reference to the accompanying drawings in which:

Fig. 5 is a view, partly in section, in the direction of the axis of rotation of the flexible drive, showing diagrammatically a known assembly, and how the present invention is applied to the same.

Fig. 6 is a longitudinal section along the line A—A of Fig. 5, Figs. 5 and 6 being on a smaller scale.

Figure 1:
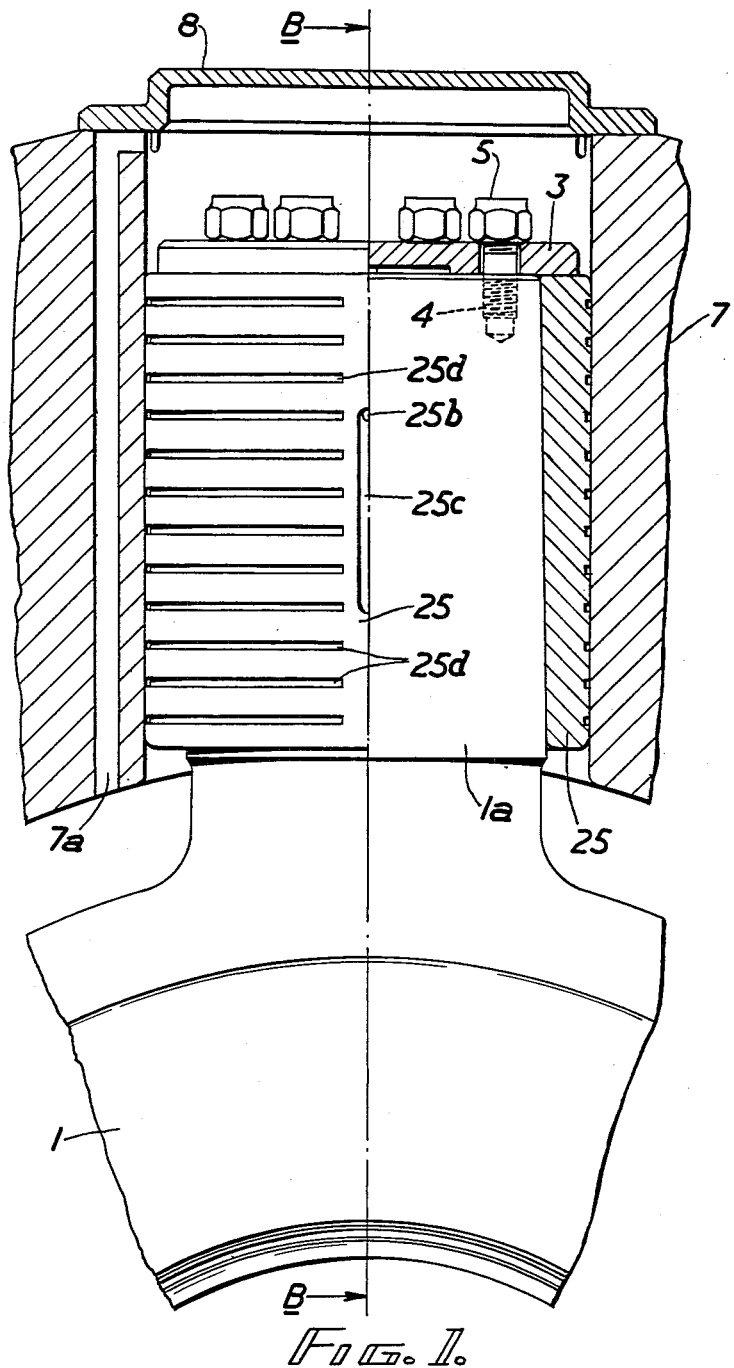
Fig. 1 is a view on a gimbal pin, partly in section, in the direction of the axis of rotation of the gimbal ring member which is shown broken off.

The gimbal ring member 1 has four radial pins 1a arranged on two diameters at right angles to one another. The one radial pin shown is slidable in a link 7 which is attached by means of rubber bonded bushings or discs (not shown) to the driving arm 2 of the flexible drive.

Likewise the radial pins on the other diameter are slidable in links attached to the driven arm of the flexible drive.

The pin 1a tapers outwards and carries a sleeve 25 which is attached by means of an end plate 3, screw studs 4 and nuts 5.

The bore in the link 7 wherein the sleeve 25 slides is closed at its outer end by a cap 8. The space enclosed between the outer end of the pin 1a and the said cap 8 is vented by bores 7a (one of which is shown in Fig. 1) to points lying approximately at the same radial distance from the axis of rotation of the flexible drive as the inner end of the bore for the pin 1a.

Figure 2:
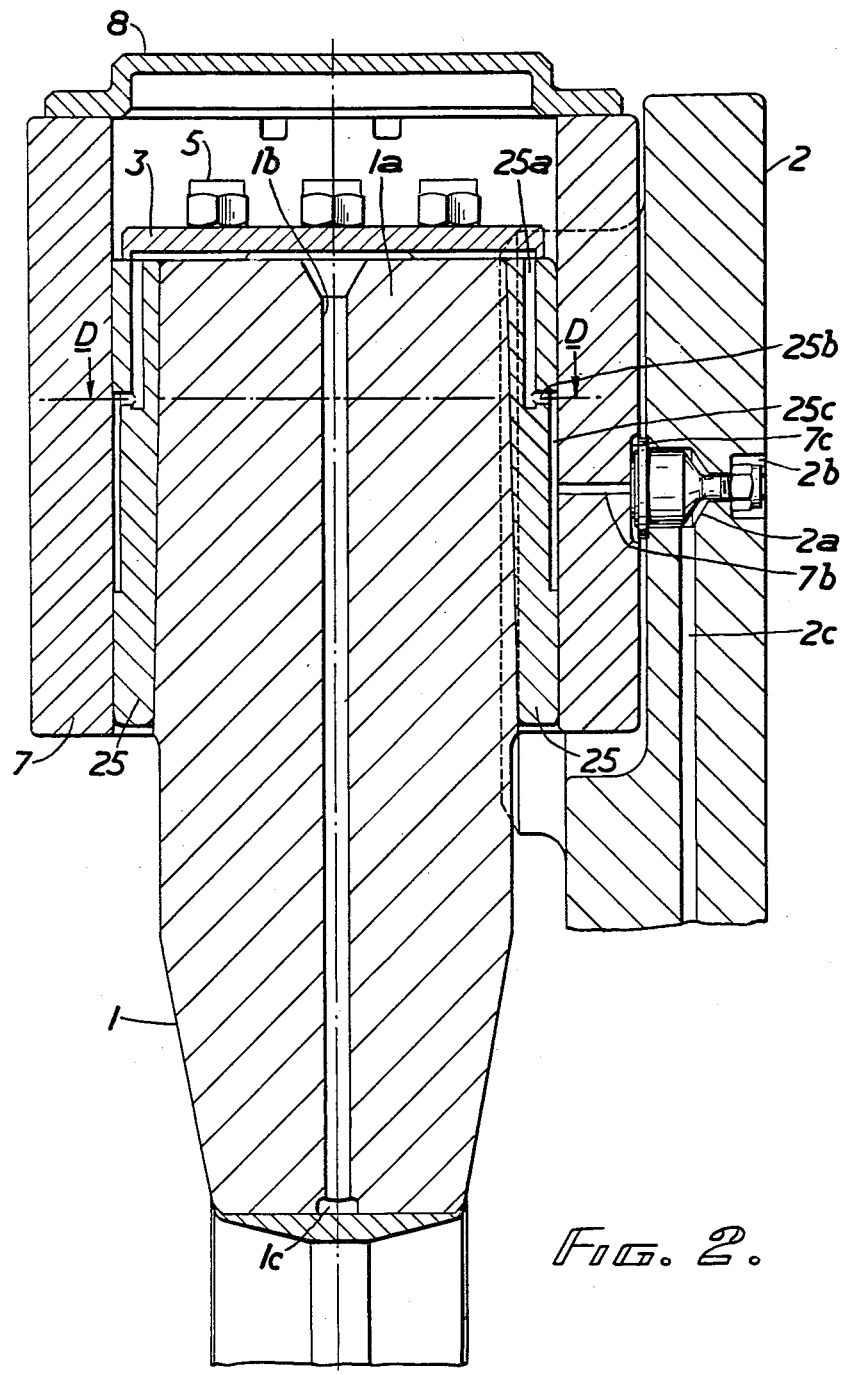
Fig. 2 is a section on the line B—B of Fig. 1.

The pin 1a has a central bore 1b (Fig. 2) leading through the gimbal ring member 1 to an annular groove 1c at the inner circumference thereof which is closed by an inner ring. The spaces between the end plates 3 and the outer faces of the pins 1a are accordingly in communication with one another through the bores 1b and the groove 1c. These spaces communicate through bores 25a, 25b with grooves 25c arranged parallel to the axis of the pins 1a at the front and rear of the sleeves 25 as viewed in the direction of the axis of rotation.

Figure 4:
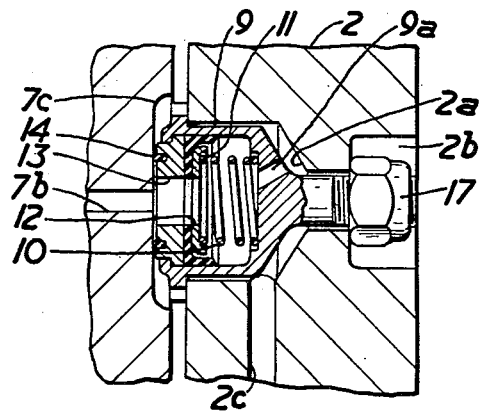
Fig. 4 shows a detail of Fig. 2 on a larger scale.

These grooves 25c communicate through a bore 7b with a flat recess 7c on the side of the link facing the driving arm 2. In a recess 2a of the latter a cylinder 9 (Fig. 4) is attached by means of a nut 17 housed in a recess 2b on the other side of the arm 2. A plunger 12 is slidable in the cylinder 9 and sealed therein by means of a packing ring 13. A coiled compression spring 10 bears on the bottom of the cylinder 9 and through a washer 11 on the packing ring 13. The plunger 12 bears with its outer face against the flat recess 7c, and is sealed there by a gland ring 14 in its face. The plunger 11 has a central bore, and the cylinder 9 has a calibrated bore 9a putting its interior in communication with the recess 2a in the driving arm 2, which is in turn in communication through a bore 2c with the adjacent bearing (not shown) of the driving member. Lubricating oil is accordingly supplied from this bearing through bore 2c, recess 2a, cylinder 9, plunger 12, bore 7b, groove 25c, bores 25b, 25a to the space between the end plate 3 and the end of the gimbal pin 1a.

Figure 3:
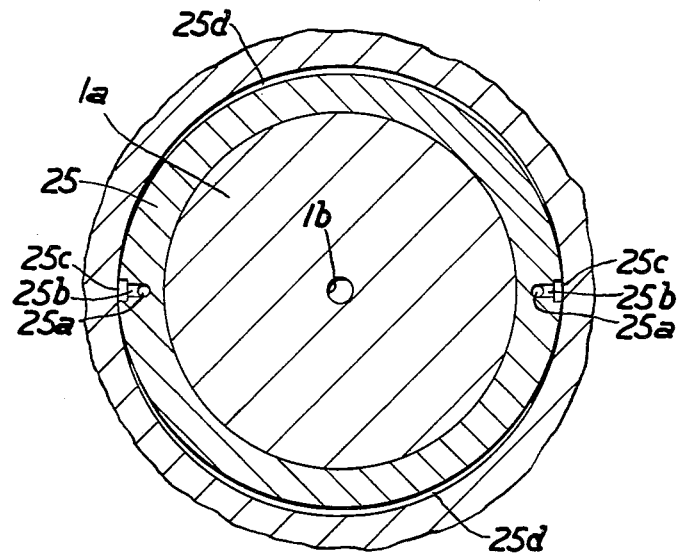
Fig. 3 is a section on the line D—D of Fig. 2.

As will be seen in Figs. 1 and 3, the mantle face of the sleeve 25 is provided with two sets of parallel crescent shaped grooves 25d which fade out towards the front and rear sides of the sleeves 25 where the said longitudinal grooves 25c are located. Thereby a constancy of pressure drop of the oil escaping from said groove 25c into the circumferential grooves 25d is attained, the radial width of the path which the oil has to follow being half the difference between the inner diameter of the bore in the link 7 and the outer diameter of the sleeve 25. This clearance on the sides not loaded by torque will remain substantially constant over the life of the sleeve 25 despite the wear and tear on the working faces thereof.

While I have described and illustrated a typical and useful embodiment of my said invention I wish it to be understood that I do not limit myself to the particular details and dimensions described and illustrated, for obvious modifications will occur to a person skilled in the art.

What I claim as my invention and desire to secure by Letters Patent is:

1. A flexible drive comprising in combination: a driving member, a driven member and a gimbal member all arranged coaxially with one another, the said gimbal member having a gimbal ring and radial gimbal pins fixedly connected to said gimbal ring sleeves removably fitted over the said gimbal pins, links resiliently connected to the said driving member and driven member respectively and having bores sliding on the said sleeves, a bearing journalling the said driving member and supplied with lubricating oil under pressure from an external source, resilient plunger couplings arranged in the said driving member and each contacting a link adjacent the said driving member on the sides of the said links which lie in the direction of the axis of the said bearing journalling the said driving member, an oil duct being provided in each of the said links leading from said resilient plunger couplings to the sliding face of the said sleeves in the said links, and an oil duct being provided in the said driving member establishing communication between the said bearing and the said resilient plunger coupling, whereby the said sliding faces are provided with lubricating oil from the said source.

2. A flexible drive as claimed in claim 1 wherein longitudinal grooves are provided on the sliding faces of the said sleeves lying fore and aft in the direction of the axis of the said bearing journalling the said driving member which communicate with the said oil ducts in the said links, and wherein crescent shaped grooves are arranged parallel to one another on the said sliding faces with their deepest points on those parts of the said sliding faces which lie in the plane of rotation of the said drive and fading out towards the said longitudinal grooves.

3. A flexible drive as claimed in claim 1 wherein the said sleeves are detachably fixed on tapering seats on the said gimbal pins.

4. A flexible drive comprising in combination: a driving member, a driven member and a gimbal member all arranged co-axially with one another, the said gimbal member having a gimbal ring and radial gimbal pins fixedly connected to said gimbal ring, sleeves removably fitted over the said gimbal pins, links resiliently connected to the said driving member and driven member respectively and having bores sliding on the said sleeves, a bearing journalling the said driving member and supplied with lubricating oil under pressure from an external source, resilient plunger couplings arranged in the said driving member and each contacting a link adjacent the said driving member on the sides of the said links which lie in the direction of the axis of the said bearing journalling the said driving member, an oil duct being provided in each of the said links leading from the said resilient plunger couplings to the sliding face of the said sleeves in the said links, and an oil duct being provided in the said driving member establishing communication between the said bearing and the said resilient plunger coupling, whereby the said sliding faces are provided with lubricating oil from the said source, and caps closing the bores in the said links to prevent loss of lubricating oil owing to centrifugal force, ducts being provided in the said links connecting the space between the ends of the said gimbal pins and the said caps to vent points lying at substantially the same radial distance from the axis of rotation of the said drive as the inner ends of the said sliding faces in the said links.

References Cited in the file of this patent

UNITED STATES PATENTS

| | | |
|---|---|---|
| 1,756,335 | Bijur | Apr. 29, 1930 |
| 1,908,086 | Urch | May 9, 1933 |
| 2,040,002 | Jones | May 5, 1936 |
| 2,554,739 | Hughes | May 29, 1951 |